United States Patent [19]

Kirchner

[11] 4,258,438
[45] Mar. 31, 1981

[54] GARMENT FOR DRESSING OUT AND SKINNING ANIMALS

[76] Inventor: Leatha Kirchner, 28489 Barton, Garden City, Mich. 48135

[21] Appl. No.: 30,835

[22] Filed: Apr. 17, 1979

[51] Int. Cl.³ .................... A41D 27/12; A41D 3/08
[52] U.S. Cl. .......................................... 2/46; 2/88; 2/269
[58] Field of Search ............... 2/46, 59, 84, 87, 88, 2/94, 269, 93

[56]  References Cited
U.S. PATENT DOCUMENTS

| | | | |
|---|---|---|---|
| D. 59,555 | 11/1921 | Ladd | 2/46 X |
| 273,770 | 3/1883 | Shelby | 2/269 X |
| 1,751,872 | 3/1930 | Medaugh | 2/59 X |
| 2,521,767 | 9/1950 | Zecha | 2/84 X |
| 2,728,916 | 1/1956 | Clarke et al. | 2/84 X |
| 2,911,651 | 11/1959 | Nye et al. | 2/84 |
| 2,914,773 | 12/1959 | Walter | 2/269 |
| 2,973,523 | 3/1961 | Brainard et al. | 2/46 |

FOREIGN PATENT DOCUMENTS 481990  9/1929  Fed. Rep. of Germany .............. 2/269

Primary Examiner—H. Hampton Hunter
Attorney, Agent, or Firm—Charles W. Chandler

[57] ABSTRACT

A disposable garment for hunters useful for field dressing out and skinning of large animals, such as deer and elk. The garment is formed of a transparent, waterproof material, and has gloves integrally connected to the ends of the sleeves. The gloves each have at least two fingers which the hunter may insert between the hide and the carcass of the animal to form an opening for inserting a hunting knife to slice the animal's hide.

1 Claim, 5 Drawing Figures

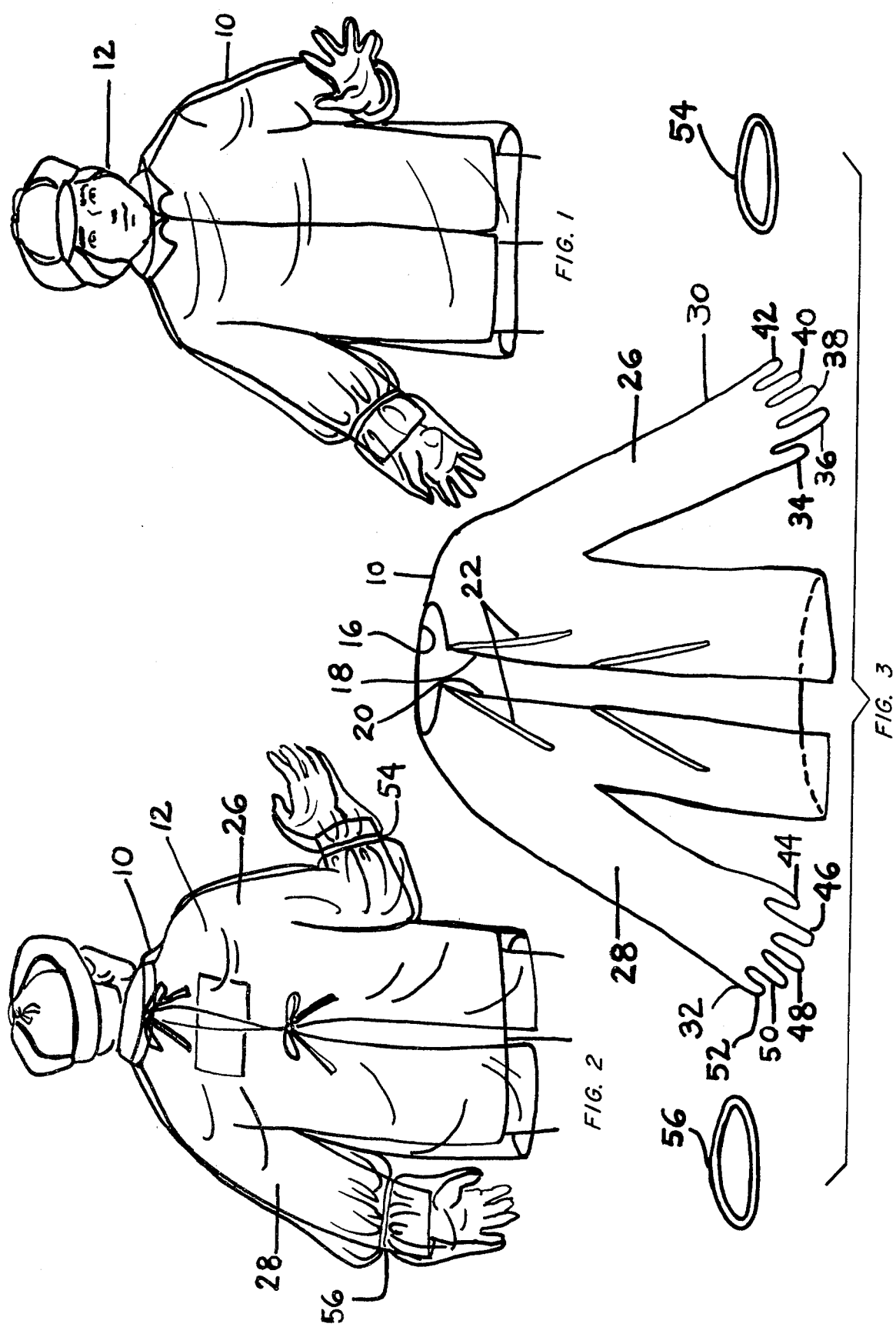

GARMENT FOR DRESSING OUT AND SKINNING ANIMALS

BACKGROUND OF THE INVENTION

This invention is related to disposable garments for hunters, and more particularly to a waterproof garment having gloves integrally connected to the ends of the sleeves to assist the user in dressing out large game in the field.

Freshly killed animals, such as deer, elk, bear, and moose, must be prepared immediately after they have been killed, and before they are removed from the woods. The procedure used in gutting an animal is both unpleasant and messy. Even skilled and careful hunters get some blood on their hunting garments unless they are removed. This is very inconvenient in cold weather.

Disposable garments are known in the prior art for other purposes. For example, U.S. Pat. No. 3,727,236 to Lloyd discloses a garment of paper. However, such a garment would not be useful in protecting a hunter's garments from blood. Furthermore, the prior art, such as Lloyd, employs integral mitts which would not be useful to a hunter in cutting an animal because he normally employs his fingers to form an opening between the hide and the intestines to insert a hunting knife for cutting through the hide. The knife in one hand and the fingers of the opposite hand must cooperate to completely remove reproductive organs. This cannot be accomplished with mitts.

SUMMARY OF THE INVENTION

The broad purpose of the present invention is to provide a disposable garment of waterproof material having a body panel for enclosing the trunk of the user's body and gloves integrally connected to the sleeves. The gloves have fingers for assisting the user in cutting the animal's hide.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is a front view of a user wearing a disposable garment illustrating the preferred embodiment of the invention;

FIG. 2 is a rear view of the garment of FIG. 1;

FIG. 3 is a view of the garment separated from the user;

DESCRIPTION OF THE PREFERRED EMBODIMENT

Figure 4:
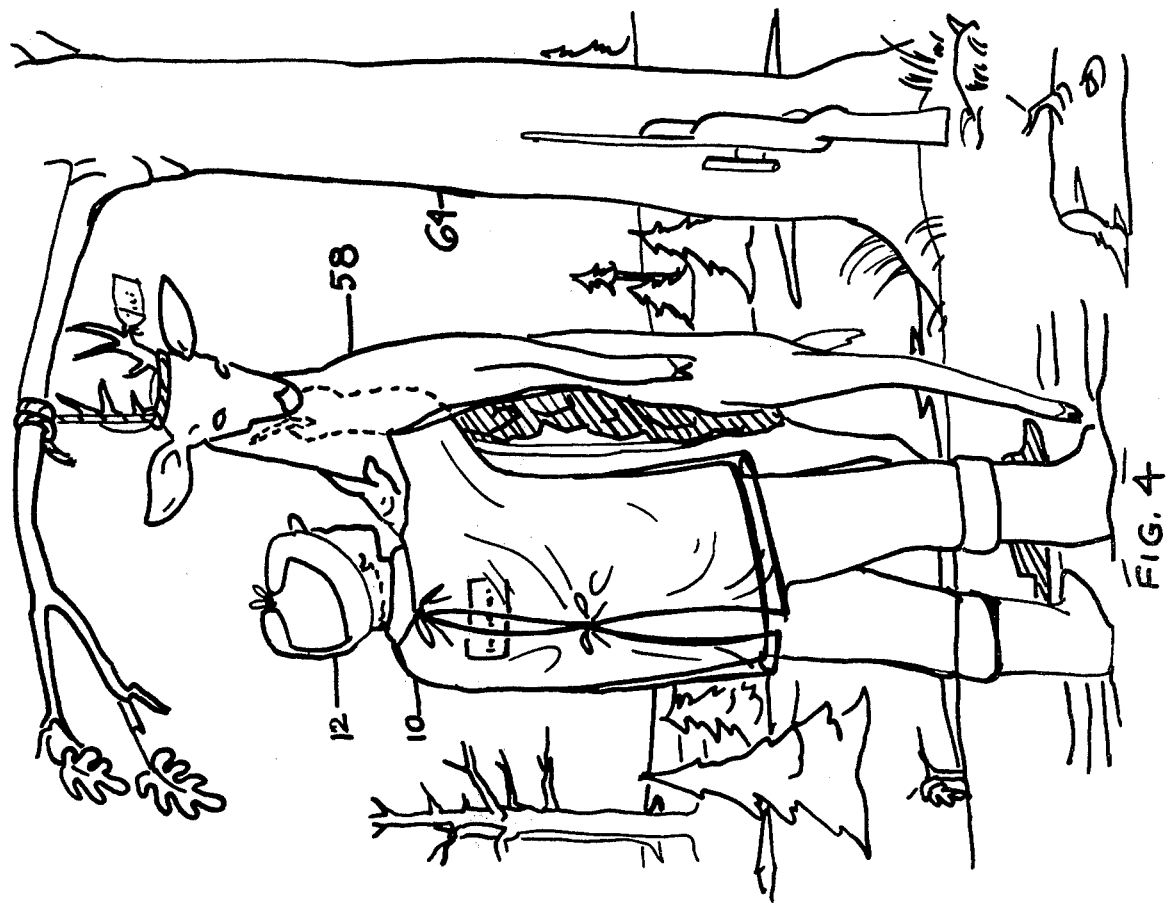
FIG. 4 is a view illustrating the manner in which the garment is worn over the user's hunting clothes while field dressing a deer.

Referring to the drawings, a preferred disposable garment 10 is illustrated in FIGS. 1, 2, and 4, worn by a user 12. Garment 10 comprises a body 14 having a top opening 16 for the user's neck. Body 14 has a sufficient length to extend below the hunting jacket worn by the user, and a sufficient bulk to accomodate commercially-available jackets.

The rear of body 14 has a pair of vertical edges 18 and 20 defining a read opening for receiving the hunter's trunk.

Upper string ties 22 and lower string ties 24 provide means for the user to tie the rear edges together to close the garment.

A pair of sleeves 26 and 28 are integrally connected to opposite sides of the body and have a sufficient bulk to readily admit the user and his hunting jacket.

A glove 30 is integrally connected to the lower end of sleeve 26, and a second glove 32 is integrally connected to the lower end of sleeve 28.

Glove 32 has a thumb 34 and fingers 36, 38, 40, and 42. Similarly, glove 30 has a thumb 44 and fingers 46, 48, 50, and 52. Each sleeve has a length longer than that of a typical user's arm. An elastic band 54 is adapted to be mounted just above the wrist of sleeve 26, and a second elastic band 56 is adapted to be mounted adjacent the wrist of sleeve 28. Bands 54 and 56 provide means for adjusting the length of the sleeves to accomodate the arm length of the user.

Garment 10 is preferably formed of a lightweight, transparent, waterproof material such as polythene plastic. The transparent material permits the hunter to display the traditional red or orange color of his hunting garment in the field. The material is waterproof because the animal dressing procedure involves a considerable amount of blood. The material is preferably formed of a relatively thin plastic since the user inserts his fingers between the hide and the interals of the animal during the dressing out procedure.

Figure 5:
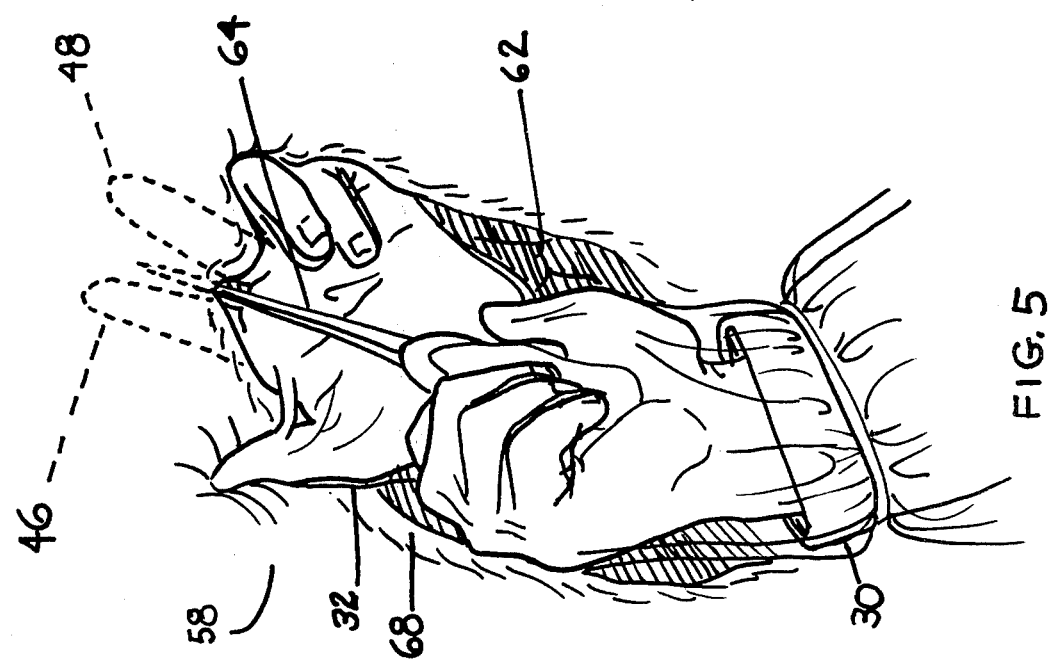
FIG. 5 shows the manner in which a knife is employed to cooperate with a glove in separating the hide from the intestines of an animal.

FIGS. 4 and 5 illustrate the manner in which the garment and gloves are employed. Referring to FIG. 5, deer 58 has a hide 60 connected to carcass 62. The hunter slips one of his fingers between the hide and the carcass to form a small opening. Then a second finger is slipped adjacent the first finger to enlarge the opening, as illustrated in FIG. 5. He then inserts knife 64 between fingers 46 and 48 to cut through the hide. By advancing his fingers and the knife, he gradually opens the animal to remove various internal organs.

FIG. 4 shows the manner in which garment 10 is employed for dressing out deer 58 when it is hung by its antlers from tree 64.

The preferred garment is only temporarily used when the animal is being prepared. When the animal has been prepared, the user removes the garment and either disposes of it, or in some cases, wraps the heart, liver, and other organs in the garment and deposits them in the cavity of the animal to transport them home. Thus the garment provides a sanitary bag for the organs and eliminates needless litter in the woods.

Having described my invention, I claim:

1. A disposable protective jacket of waterproof material suitable for wearing over hunting garments, comprising:
   a body panel, including a front, a top opening for receiving the neck of the user, and a rear opening extending from the top opening to the bottom of the body panel for receiving the user therein at such time as he is wearing hunting garments;
   a pair of sleeves of equal length integrally connected to opposite sides of the body panel for receiving the arms of the user;
   a glove integrally connected to the lower end of said pair of sleeves, each glove having at least a thumb and two individually movable fingers adjacent said thumb, said two fingers having a length sufficient to receive a hunting knife between the fingers to assist the user in dressing out an animal, said gloves and said sleeves having an overall length such that the lower ends of the gloves substantially correspond to the distance from the top to the bottom edge of the body panel;

a resilient wrist band mounted on each of said sleeves adjacent said gloves for adjusting the position of the sleeve on the user's arm; and connecting means mounted adjacent the rear opening of the body panel for closing it about the user and his hunting garments.

* * * * *